United States Patent [19]

Naito

[11] Patent Number: 5,795,471
[45] Date of Patent: Aug. 18, 1998

[54] SHOWER HEAD HAVING A WATER PURIFYING FUNCTION

[76] Inventor: Harusuke Naito, 17-5, Haraojima 2-chome, Okayama-shi, Okayama-ken, Japan

[21] Appl. No.: 784,004

[22] Filed: Jan. 15, 1997

Related U.S. Application Data

[63] Continuation-in-part of Ser. No. 655,620, May 30, 1996, abandoned.

[51] Int. Cl.⁶ .................................................. C02F 9/00
[52] U.S. Cl. ......................... 210/223; 210/282; 210/283; 210/449
[58] Field of Search .......................... 210/223, 266, 210/282, 283, 290, 449

[56] References Cited

U.S. PATENT DOCUMENTS 4,501,661  2/1985  Karasawa .................................. 210/223
5,008,011  4/1991  Underwood ............................... 210/449
5,152,464  10/1992  Farley ....................................... 210/449
5,545,314  8/1996  Parise et al. .............................. 210/282
5,549,822  8/1996  Ferguson .................................. 210/282

*Primary Examiner*—Ivars Cintins
*Attorney, Agent, or Firm*—Hedman, Gibson & Costigan, P.C.

[57] ABSTRACT

A shower device having a water purifying function includes a cartridge type filter formed with a water inlet at one end and a water outlet at the other end and means for showering such as a shower head connected to the water outlet of the cartridge type filter. The cartridge type filter contains a tannin layer consisting of a material comprising tannin, a bakuhanseki layer consisting of granular bakuhanseki formed in a layer, a ceramic layer consisting of granular ceramic formed in a layer, a magnetite layer consisting of broken pieces of magnetite formed in a layer and provided at least on the water inlet side or on the water outlet side of the ceramic layer, and magnetizing means such as magnets for magnetizing the magnetite layer.

2 Claims, 8 Drawing Sheets

SHOWER HEAD HAVING A WATER PURIFYING FUNCTION

BACKGROUND OF THE INVENTION

This application is a continuation-in-part application of U.S. patent application Ser. No. 08/655,620 filed on May 30, 1996, now abandoned.

This invention relates to a shower head and, more particularly, to a shower head having a water purifying function, particularly removing residual chlorine in tap water.

A human body bathing in tap water shower absorbs residual chlorine contained in tap water. It is reported that the amount of chlorine absorbed in a human body by bathing in tap water shower for, for example, fifteen minutes is almost equivalent to the amount of chlorine absorbed by drinking 1 liter of tap water. Besides, chlorine adversely affects cutaneous respiration and excretion of a toxin through the skin by injuring a horney layer which protects a base layer of the skin thereby causing a chapped skin or a dry skin. Chlorine injures also keratin which is a chief element of hair and thereby damages cuticles. Further, when concentration of chlorine exceeds 3 mg/l, the human sense of smell detects an unpleasant chlorine smell.

It is an object of the invention to provide a shower device which has a sufficient ability to remove chlorine and has an ability to reduce hardness of water when hardness of shower water is too high.

SUMMARY OF THE INVENTION

For achieving the above described objects of the invention, there is provided a shower device having a water purifying function comprising a cartridge type filter formed with a water inlet at one end and a water outlet at the other end and means for showering connected to the water outlet of said container, said cartridge type filter containing a tannin layer consisting of a material comprising tannin, a bakuhanseki layer consisting of granular bakuhanseki formed in a layer, a ceramic layer consisting of granular ceramic formed in a layer, a magnetite layer consisting of broken pieces of magnetite formed in a layer and provided at least on the water inlet side or on the water outlet side of the ceramic layer, and magnetizing means for magnetizing the magnetite layer. In one aspect of the invention, the magnetizing means consists of a pair of annular magnets provided both on the water inlet side and on the water outlet side of the ceramic layer in such a manner that these annular magnets coincide with each other in the direction of magnetic lines of force and that the direction of the magnetic lines of force is parallel to the direction of flow of water.

According to the invention, the tannin layer formed in the cartridge type filter performs the function of a chlorine removing layer and removes chlorine in water to be treated to a sufficient degree.

In one aspect of the invention, the magnetizing means for magnetizing the magnetite layer comprises a pair of annular magnets provided both on the water inlet side and on the water outlet side of the ceramic layer in such a manner that these annular magnets coincide with each other in the direction of magnetic lines of force and that the direction of the magnetic lines of force is parallel to the direction of flow of water.

It is an important feature of the invention that annular permanent magnets are employed as a magnetic field generation device provided in a position to magnetize the magnetite layer. According to this arrangement, concentration of residual chlorine in water to be treated is reduced to a greater degree than in a case where coin shaped magnets placed on a spacer are used as in a conventional water purifier notwithstanding the fact that the residual flux density in this arrangement is smaller (i.e., the strength of the magnetic field is weaker) than in a case where the coin shaped magnets are used in the conventional manner. By virtue of this arrangement, in addition to the chlorine removal effect by the provision of the chlorine removing material layer such as an activated carbon layer or an ion-exchange resin layer which may be selectively employed, residual chlorine in water to be treated can be effectively removed.

Another important feature of the present invention is utilizing of the action of bakuhanseki. "Bakuhanseki" is a Japanese word and there is no English word or authenticated mineralogical name for it. The Chinese word for it is "maifanshih". In the specification and claims of the present application, the term "bakuhanseki" is used to designate a stone which belongs to quartz porphyry which is a kind of igneous rock, includes as its principal ingredients alkali feldspar and high temperature quartz (i.e., quartz which is crystallized at a temperature between 573° C. and 870° C.), is very porous, contains a multiplicity of elements and compounds, radiates only a very small amount of alpha ray but substantially no beta or gamma ray, has a part of the alkali feldspar ingredient changed to calcite ($CaCO_3$) due to naturally occurring carbonization, and has an appearance of white phenocryst of alkali feldspar and grey crystals of quartz being scattered as if by inlaying in a pale brown or pale grey groundmass.

Bakuhanseki is produced in some limited mountain areas in Japan and China and there has been no report that this stone has been found in other country in the world. According to an analysis made by a Japanese scientist, a bakuhanseki specimen produced in Kamo County, Gifu Prefecture in Japan contains, as its principal ingredients, about 70% silicon dioxide ($SiO_2$) and about 14% aluminum oxide ($Al_2O_3$) and, as other ingredients, magnesium oxide (MgO), potassium oxide ($K_2O$), calcium oxide (CaO), ferrous oxide (FeO), ferric oxide ($Fe_2O_3$), phosphorours pentaoxide ($P_2O_5$) and manganese oxide (MnO).

Bakuhanseki is known to discharge minerals such as iron and magnesium into water when these minerals in water are in shortage and it is also known to adsorb, owing to its porosity, residual chlorine, poisonous heavy metals such as cadmium and mercury, organic matters and bacteria in water and thereby remove these materials from water. Therefore, if bakuhanseki is used in a shower head, bakuhanseki will contribute to purifying shower water by virtue of this nature.

It is, however, not a subject matter of the present invention to utilize this known nature and effects of bakuhanseki. An experiment has been made to examine timewise change of suspension colloid in a bath (i.e., solids in a bath produced by desquamation or falling off of soils on the skin etc.) after adding 200 liters of bakuhanseki water to water of 200 liters which was left after bathing in the bath. The bakuhanseki water was provided by immersing 200 g of bakuhanseki in tap water of 200 liters for 24 hours and thereafter removing the bakuhanseki. As a result of the experiment, it has been found that bakuhanseki has an effect, which has heretofore been unknown, of dissolving the suspension colloid in the bath and reduce it as shown in the graph of FIG. 7, though reason is not known. In other words, it has been found by this experiment that tap water which has passed through bakuhanseki has an effect of removing soils produced by desquamation etc. i.e., an effect of enhancing cleaning of the skin. One feature of the present invention is to utilize this effect of bakuhanseki which has heretofore been unknown for a shower device for enhancing cleaning of the skin by shower water.

According to the invention, owing to use of the bakuhanseki layer, not only contaminants such as residual chlorine, poisonous heavy metals and bacteria in water to be treated are adsorbed and removed but the cleaning ability of the water which has passed through the shower device is enhanced with the result that removal of soils on the skin and hair by showering is facilitated.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENT

Figure 1:
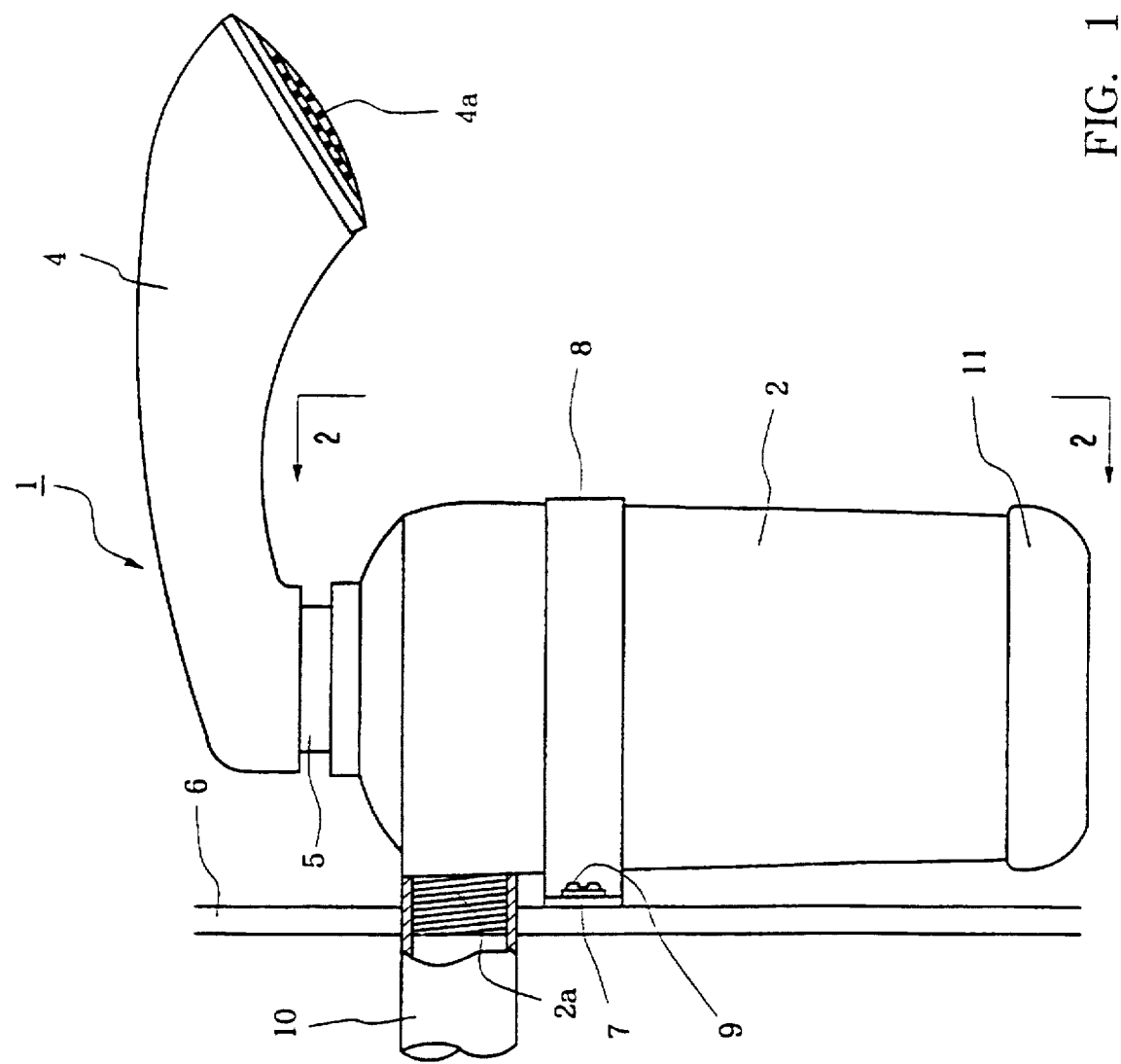
FIG. 1 is a perspective view showing an embodiment of a shower device made according to the invention.
Figure 2:
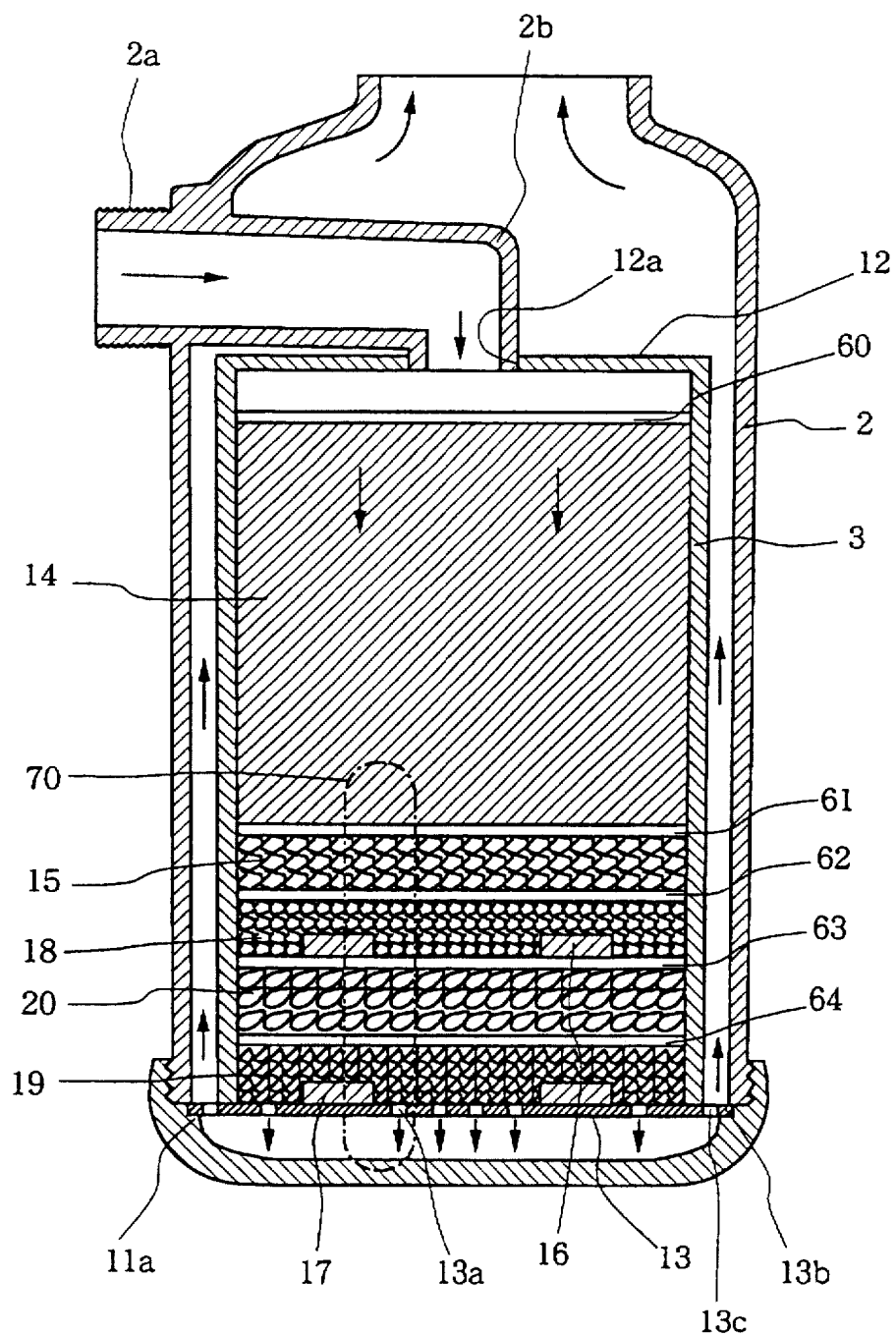
FIG. 2 is a sectional view taken along lines A—A in FIG. 1.

FIGS. 1 and 2 show an embodiment of a shower device made according to the invention. FIG. 1 is a front view of the shower device shown in a state in which the shower device is attached to a wall of a bathroom and FIG. 2 is a sectional view taken along lines A—A in FIG. 1 of a main part of the shower device.

The shower device 1 has a cylindrical housing 2 containing a cartridge type filter 3 and has also a shower head 4 which is pivotably attached to the housing 2 by means of a swivel joint 5. The shower head 4 which is of a conventional construction has a multiplicity of water outlets 4a at the end thereof.

The housing 2 is fixedly secured to a wall 6 of the bathroom by means of fixing plates 7 which are formed integrally with a band 8 embracing the housing 2 and fastened to the surface of the wall 6 by screws 9. The housing 2 has in its upper portion an water inlet 2a which is threadedly engaged with a tap water pipe fitting metal 10 which is shown partly in a section in FIG. 1. The tap water fitting metal 10 is connected to a tap water pipe (not shown). The housing 2 is closed at its lower end with a cap 11 which is threadedly fitted to the housing 2.

Referring to FIG. 2, the cartridge type filter 3 is of a cylindrical configuration and is closed at its upper end with a lid 12 and at its bottom end with a bottom plate 13. The lid 12 is formed in its central portion with an opening 12a which constitutes a water inlet in which a water conduit pipe 2b which is formed integrally with the water inlet 2a is inserted. The bottom plate 13 is formed with a multiplicity of openings 13a which constitutes a water outlet. The bottom plate 13 has an annular flange portion 13b which extends radially outside of the portion on which the filter 3 is mounted and this flange portion 13b has a multiplicity of openings 13c formed in the circumferential direction of the annular flange portion 13b. The annular flange portion 13b is supported on a stepped portion 11a of the cap 11.

The filter 3 is divided in plural sections by porous partitions 60, 61, 62, 63 and 64 which are respectively formed with a multiplicity of fine perforations.

In a section defined by the partitions 60 and 61 is provided an activated carbon layer 14 which constitutes the chlorine removing material layer. The activated carbon layer 14 consists of granular activated carbon heaped up in a layer and performs the function of removing residual chlorine, organic materials and harmful materials such as trihalomethane, red rust, mold etc.

In a section defined by the partitions 61 and 62 is provided a bakuhanseki layer 15 which consists of granular bakuhanseki heaped up in a layer. In the present embodiment, bakuhanseki of about 5 mm diameter marketed by Kabushiki Kaisha Nishio, a Japanese joint stock company, is employed.

In a section defined by the partitions 62 and 63 is provided a first magnetite layer 18 and in a section defined by the partitions 64 and the bottom plate 13 is provided a second magnetite layer 19. The first and second magnetite layers 18 and 19 consist of finely broken pieces of magnetite heaped up in a layer. These magnetite layers 18 and 19 are magnetized by the magnetic field produced by annular magnets 16 and 17 respectively provided in the first and second magnetite layers 18 and 19 and supported on the partitions 63 and the bottom plate 13 and serve to remove heavy metals and activate water molecules by magnetization of these magnetite layers 18 and 19.

It is known that activation of water molecules is at the maximum in a case where the direction of magnetic line of force is at an angle of 90 degrees with respect to the direction of flow of water. Since magnetic lines of force are produced substantially in all direction from the broken pieces of the magnetized magnetite layers 18 and 19, water molecules passing through the magnetized magnetite layers 18 and 19 are significantly activated.

A ceramic layer 20 consists of granular ceramic heaped up in a layer. This ceramic is obtained by treating white sands made from eruptive rock at a high temperature (e.g., 1100° C.). The ceramic layer 20 serves as a condenser and facilitates forming of magnetic flux.

The annular magnets 16 and 17 are provided in such a manner that these annular magnets 16 and 17 coincide with each other in the sense of the magnetic lines of force and that the direction of the magnetic lines of force is parallel to the direction of the flow of water.

The magnetic lines of force of these annular magnets 16 and 17 are combined together to form a substantially uniform and strong magnetic field 70 which is parallel to the direction of the flow of water and is of an opposite sense to the direction of the flow of water. Since the magnetic field 70 strongly magnetizes the first magnetite layer 17 and the second magnetite layer 17, water molecules are activated when water flows through the layers between magnet 16 and the magnet 17. Since the magnetic field 70 passes through the ceramic layer 20, water molecules are further activated through the ceramic layer 20.

Figure 3:
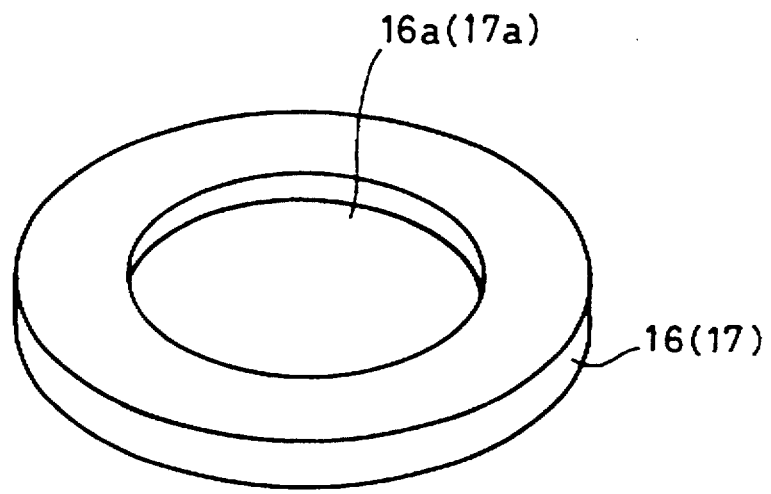
FIG. 3 is a perspective view of an example of an annular magnet used in the embodiment.

The annular magnets 16 and 17 are made in the form of a disk formed with a central opening 16a (17a) as shown in FIG. 3. Its outer diameter, inner diameter and thickness are set to proper values having regard to factors such as the size of the filter 3, necessary strength of the magnetic field and necessary amount of water to be treated per unit time.

Figure 4:
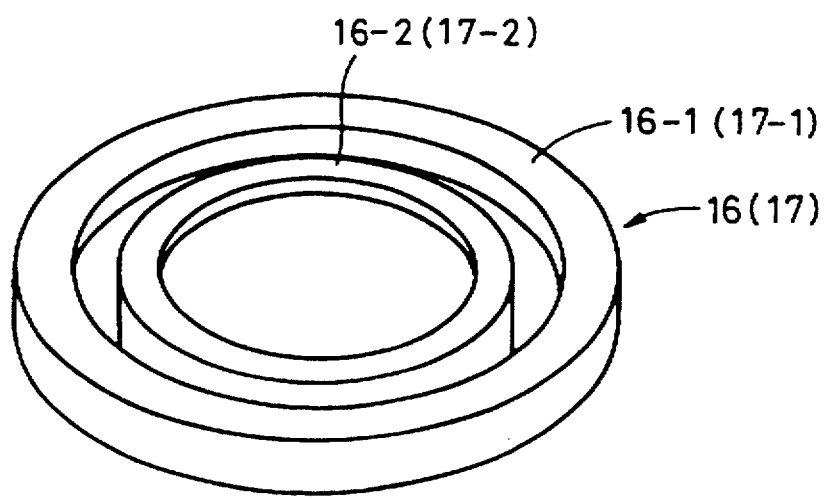
FIG. 4 is a perspective view of another example of an annular magnet.

In the present embodiment, the single annular magnet shown in FIG. 3 is used as the respective annular magnets 16 and 17. Alternatively, the annular magnets 16 and 17 may be respectively composed of concentrically disposed large and small annular magnets 16-1 (17-1) and 16-2 (17-2) as shown in FIG. 4.

One important feature of the present invention is the employment of annular magnets as the magnets for producing a magnetic field. By the employment of the annular magnets, it has been unexpectedly found that the effect of removing chlorine in tap water is significantly enhanced as compared to a case where other shape of magnets are used, though the reason therefor is not known.

Figure 5:
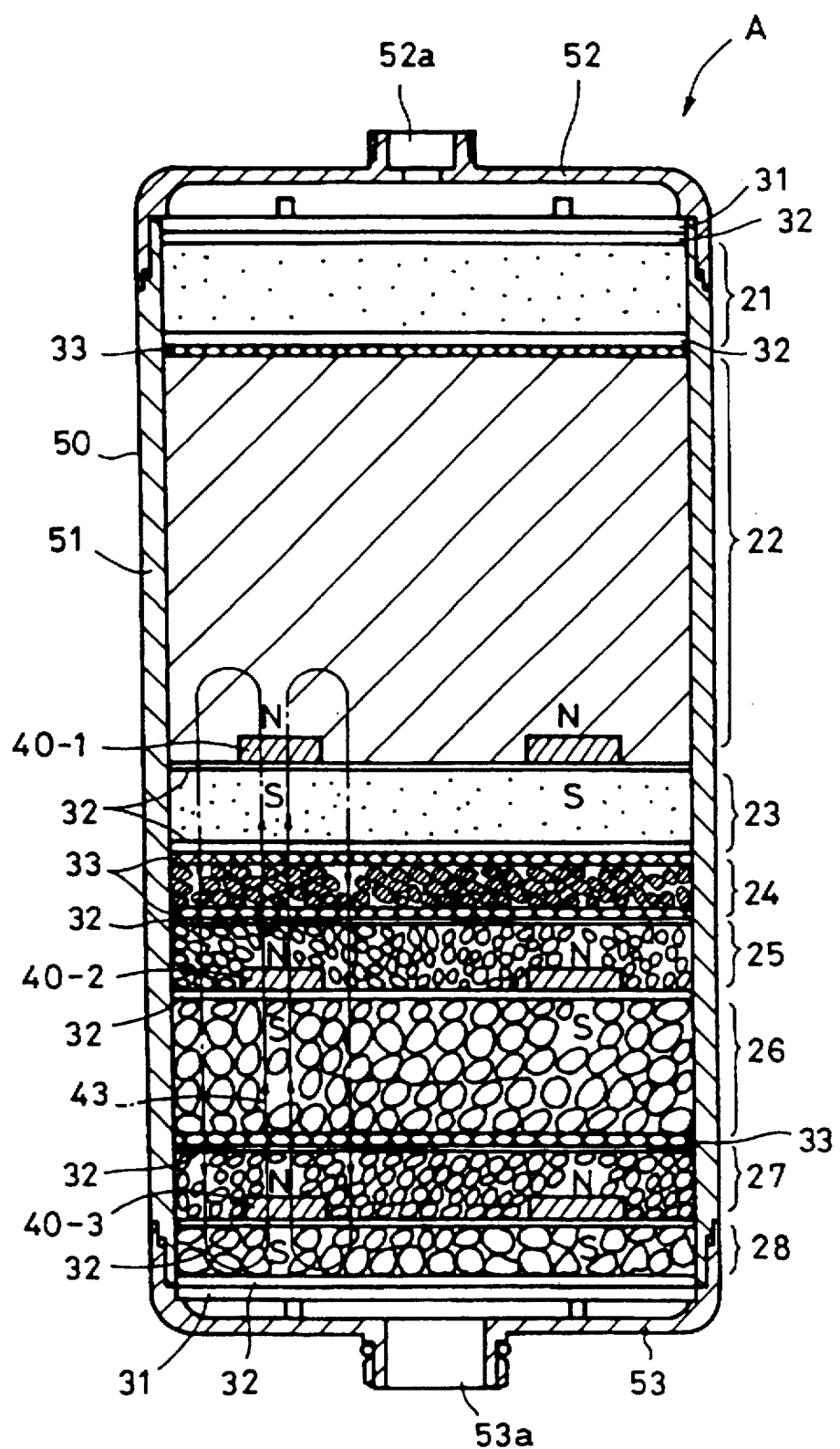
FIG. 5 is a sectional view of a filter used in an experiment for examining the chlorine removal effect of annular magnets.

This phenomenon has been confirmed by an experiment which the inventor of the present invention has conducted by using a filter shown in FIG. 5 having an internal construction which is substantially the same as the above described embodiment.

FIG. 5 is a vertical sectional view of a cylindrical filter used in this experiment. In FIG. 5, the filter A includes a housing 50, a first sand layer 21, an activated carbon layer 22, a second sand layer 23, a bakuhanseki layer 24, a first magnetite layer 25, a ceramic layer 26, a second magnetite layer 27, a taichoseki stone layer 28, porous filter plates 31, non-woven fabric layers 32, partition nets 33 and annular magnets 40-1, 40-2 and 40-3.

The housing 50 includes a cylindrical main body 51, a cap 52 having a water inlet 52a and being fitted on the upper end portion of the main body 51 and a cap 53 having a water outlet 53a and being fitted on the lower end portion of the main body 51.

The porous filter plates 31 are made of plastic plates formed with a multiplicity of small perforations. These porous filter plates 31, the non-woven fabric filters 32 and the partition nets 32 separate and hold the above described respective layers.

The filter A is made by providing in the main body 51 of the housing 50 the above described layers, filters and plates 31, 32, 21, 32, 33, 22, 40-1, 32, 23, 32, 33, 24, 33, 32, 25, 40-2, 32, 26, 33, 32, 27, 40-3, 32, 28, 32 and 31 from the upper portion to the lower portion of the main body 11 in the order described. In this structure, the annular magnets 40-1, 40-2 and 40-3 are provided in such a manner that these magnets 40-1, 40-2 and 40-3 are disposed in parallel with the interval between the annular magnet 40-1 and the annular magnet 40-2 being substantially equal to the interval between the annular magnet 40-2 and the annular magnet 40-3 and that the respective annular magnets 40-1, 40-2 and 40-3 coincide in the sense of the magnetic lines of force with one another so that the sense of the magentic lines of force of these magnets is opposite to the direction of flow of water and that the direction of the magnetic lines of force of these magnets is parallel to the direction of the flow of water.

The housing 50 of the filter used had a height of 261 mm and an inner diameter of 106 mm. As the annular magnets 40-1, 40-2 and 40-3, annular magnets each being made of ferrite and having an outer diameter of 80.4 mm, inner diameter of 39.8 mm and thickness of 8 mm was used. These annular magnets 40-1, 40-2 and 40-3 produced residual flux of 4,800 gauss.

Tap water of the city of Okayama, Japan was passed continuously through this filter and oxidation reduction potential (ORP) of treated water was measured. It is generally believed that the ORP value is reduced as the concentration of residual chlorine in water is reduced. In this measurement, the oxidation reduction potential meter HM11p produced by Toa Denka Kogyo K.K. was used and the ORP value was obtained by adding reference electrode potential of 206 mV at the water temperature of 25° C. to an ORP value obtained by the oxidation reduction potential meter. According to the experiment, the ORP value of the untreated tap water was 866 mV and the ORP value of the tap water after the treatment by the filter dropped to 586 mV.

Figure 6:
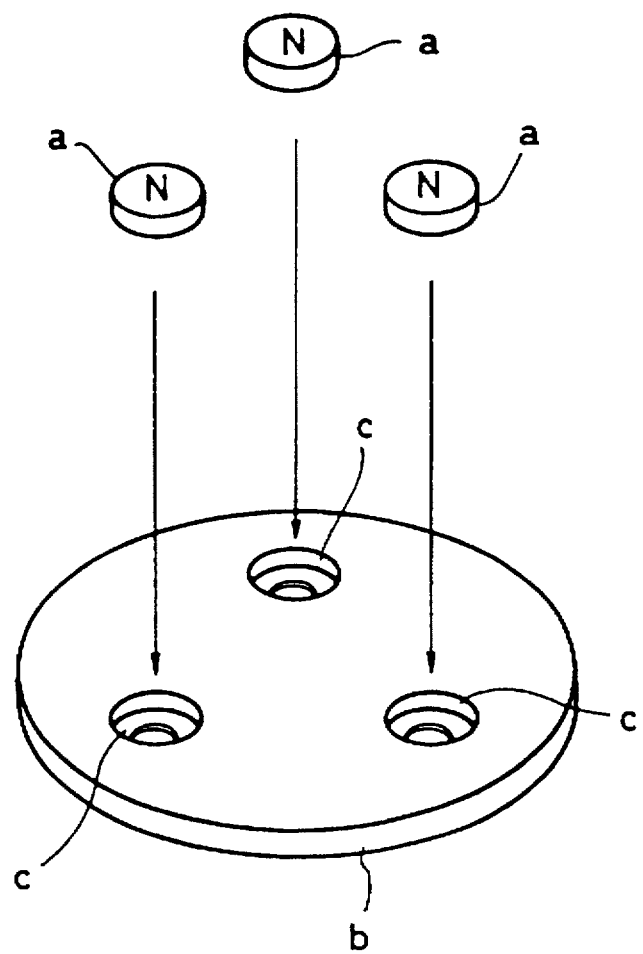
FIG. 6 is a perspective view of coin shaped magnets used in a prior art water purifier.
Figure 7:
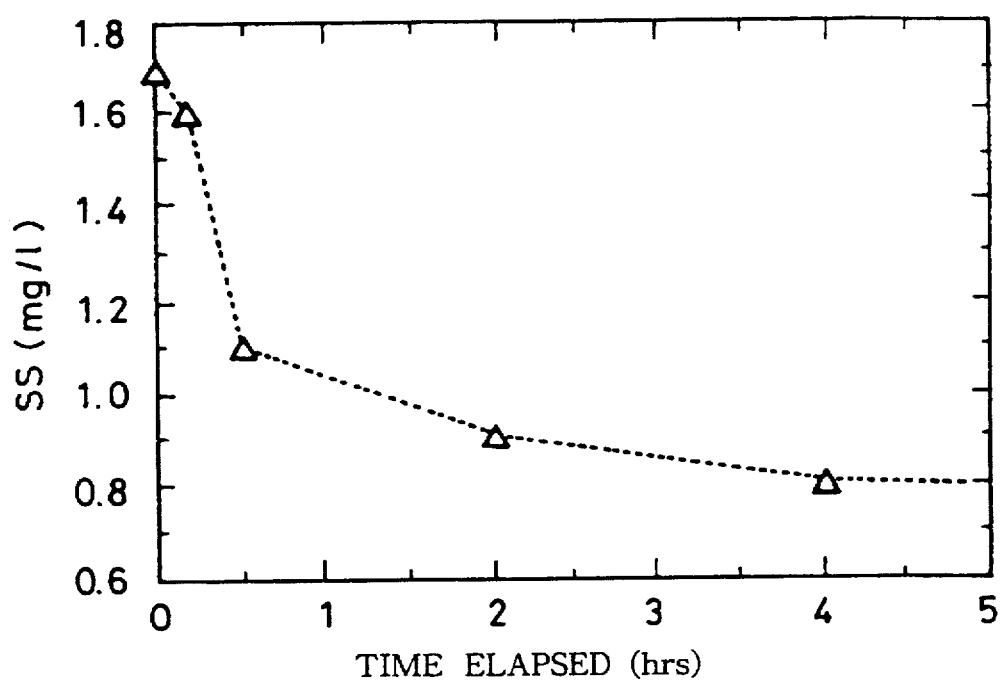
FIG. 7 is a graphical diagram showing a result of an experiment for examining a cleaning effect of bakuhanseki.

For comparison, the same tap water was passed through a filter which was of the same construction as the above described filter except that the annular magnets 40-1, 40-2 and 40-3 were replaced by magnets which were used in a conventional water purifier as shown in FIG. 6 and the ORP value of tap water after treatment by this filter was measured under the same measurement condition as described above. As the magnets of FIG. 6 constituting the respective magnet layers, three magnets a made of neodymium and having the shape of a coin each having a diameter of 23.5 mm and a thickness of 3.4 mm were disposed in three magnet receiving recesses c of a plastic spacer b formed with a multiplicity of perforations at an interval of 120 degrees with respect to the center of the spacer b. Residual flux of the magnets a was 12,000 gauss. As a result of experiments, the ORP value of the tap water after treatment by this filter using the magnets a of FIG. 6 dropped to 656 mV.

The comparative experiments show that the filter using the annular magnets according to the invention exhibits a superior oxidation reduction potential reduction effect, that is, a superior residual chlorine removal effect, compared with the prior art filter using the coin shaped magnets notwithstanding the fact that the prior art filter has a much stronger magnetic field than the filter using the annular magnets.

Accordingly, it will be understood that the shower device according to the present invention using the annular magnets 16 and 17 has a superior residual chlorine removal effect to a shower device using magnets of other shape.

The operation of the above described embodiment will now be described.

Tap water to be treated enters from the water inlet 2a into the water inlet 12a of the filter 3. The water passes through the activated carbon layer 14 and has residual chlorine, organic materials and harmful materials removed by the action of the activated carbon. If the water to be treated is too hard, it will be softened.

Then, the water to be treated passes through the bakuhanseki layer 15 and has remaining residual chlorine and other contaminants such as heavy metals etc. removed and has its cleaning ability enhanced.

The water to be treated then passes through the magnetic field generation section made of the annular magnets 16 and 17, the first and second magnetite layers 18 and 19 and the ceramic layer 20 and has water molecules activated by the action of the magnetic field 70 with resulting increase in its cleaning ability, lowering of hardness of water, softening of water and prevention of bacteria in water remaining in the shower device.

Figure 8:
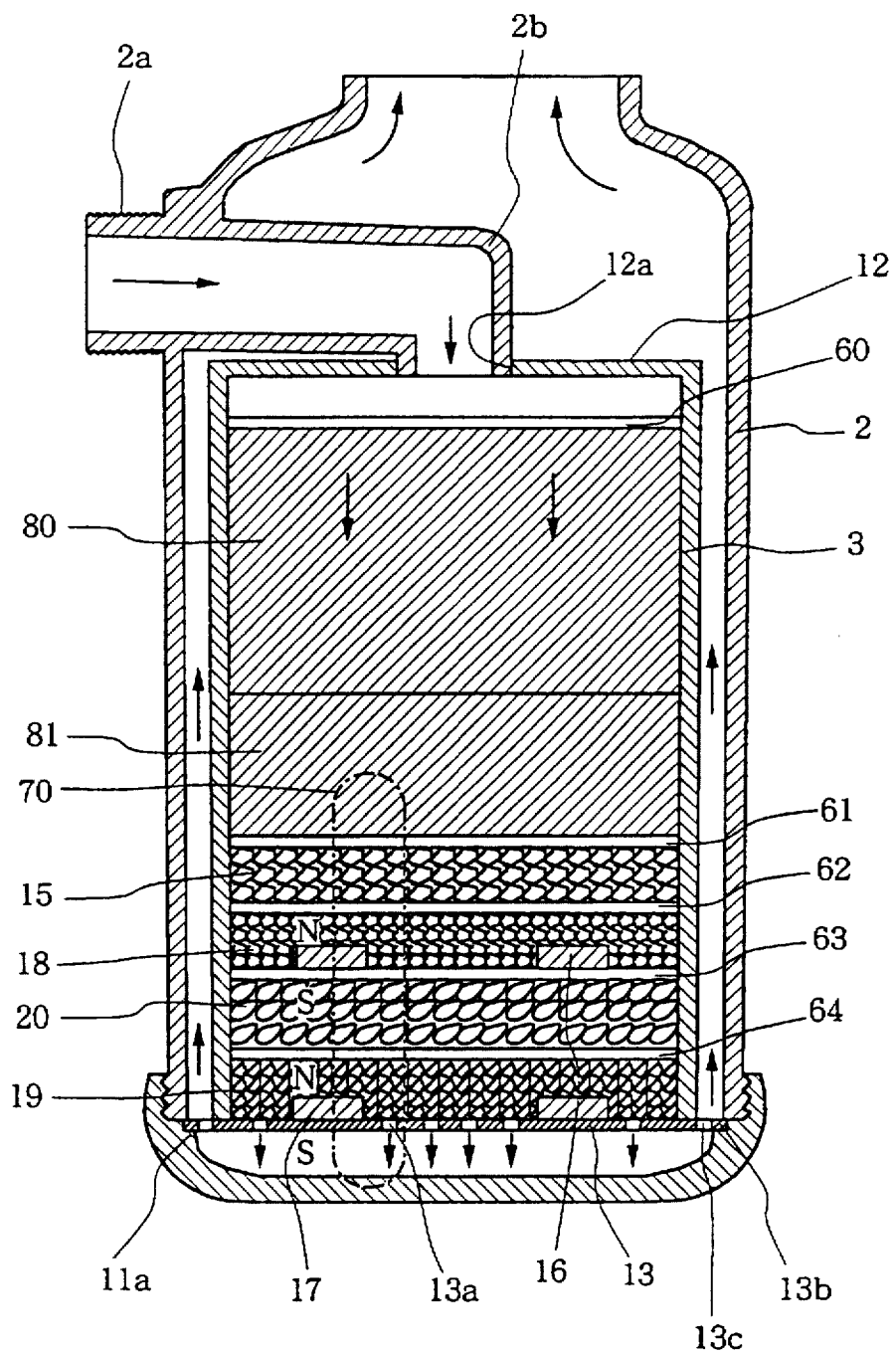
FIG. 8 is a sectional view of another embodiment of a shower device according to the invention.

FIG. 8 is a sectional view showing another embodiment of the invention.

In this embodiment, the same component parts as those of the embodiment of FIG. 2 are designated by the same reference characters and description thereof will be omitted.

This embodiment differs from the embodiment of FIG. 2 in that the chlorine removing layer consists of an ion-exchange resin layer 80 and an exchanged ion removing layer 81 instead of the activated carbon layer. The ion-exchange resin layer 80 in this embodiment consists of anionic ion-exchange resin made by Mitsubishi Kagaku K.K. and containing sodium carbonate. The exchanged ion removing layer 81 consists of material which combines with an ion which is discharged in water to be treated in exchange for chlorine ion by the ion exchanging action of the ion-exchange resin. In this embodiment, the exchanged ion removing layer 81 consists of coral sand made by Kabushiki Kaisha Nishio and containing sodium.

According to this embodiment, chlorine ion in water to be treated is adsorbed to the ion-exchange resin layer by the ion exchanging action of the ion-exchange resin layer and, in exchange therefor, a carbonate ion is discharged in water. The carbonate ion however combines with sodium ion of the coral sand containing sodium to produce sodium carbonate which is adsorbed onto the coral sand. Thus, there is no possibility that the carbonate ion will increase hardness of the water to be treated or give an unpleasant taste to the water. The ion-exchange resin may be selected from among various types of ion-exchange resins. The material constituting the exchanged ion removing layer is not limited to coral sand but any material which has an ability to combine with an ion discharged from the ion-exchange resin in exchange ror chlorine ion may be used.

According to this embodiment, ion-exchange resin has a longer life for adsorbing chlorine in water to be treated than active carbon and, accordingly, frequency of replacing the cartridge filter will be reduced by the employment of ion-exchange resin in the chlorine removing layer.

Figure 9:
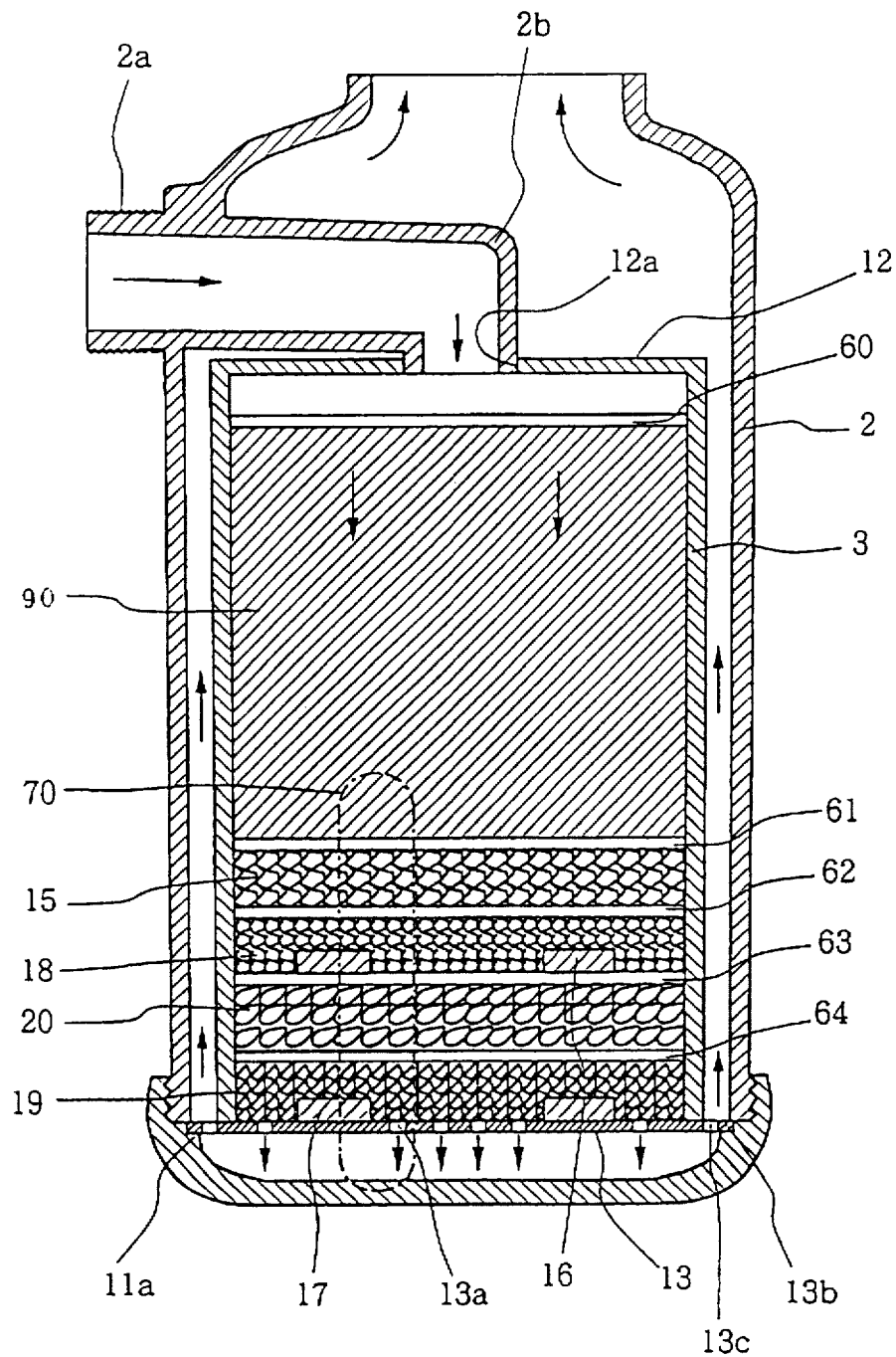
FIG. 9 is a sectional view of still another embodiment of a shower device according to the invention.

FIG. 9 is a sectional view similar to FIG. 2 showing another embodiment of the shower head according to the invention. In this embodiment, the same components as those of the embodiment of FIG. 2 are designated by the same reference characters and description thereof will be omitted.

In the embodiment of FIG. 9, a tannin layer 90 consisting of a material comprising tannin is provided as a chlorine removing material layer. For the purpose of the invention, a preferable tannin is a condensed tannin and the most preferable tannin is tannin of persimmon (shibuol). Tannin of persimmon has been found to be most preferable because it has been experimentally proved to have the largest chlorine removing effect and besides it is easily available in the market at a moderate cost.

For forming the tannin layer 90, tannin may be mixed with a synthetic resin gel and the mixture may be charged in the cartridge. Alternatively, tannin mixed with wax or diatom earth impregnated with tannin may be charged in the cartridge as the tannin layer 90.

Tannin is a polyphenol having many hydroxyl groups in its structure and these hydoxyl groups are separated into oxygen and hydrogen ions in water as shown in the following formular (1):

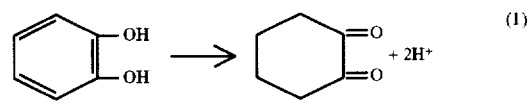

Accordingly, in accordance with the following formula (2), chlorine ions in water to be treated partly replace hydrogen ions and are retained in the tannin layer 60 and partly are combined with hydrogen ions to become harmless.

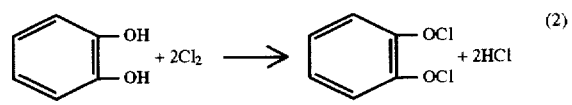

Thus, majority of chlorine ions in water to be treated are removed by the tannin layer 60 and water to be treated flows to the bakuhanseki layer of the next stage and the same treatment as in the embodiment of FIG. 2 is subsequently performed.

If one or more essential oils extracted from herbs such as jasmine, lemon grass, geranium, rosemary, lavender and camomile are added in the tannin layer 60, water to be treated will be imparted with flagrance and an aromatic therapy effect will be produced in addition to the shower effect by the shower water.

Various other modifications may be made within the scope and spirit of the invention as defined in the appended claims.

What is claimed is:

1. A shower device having a water purifying function comprising a cartridge type filter formed with a water inlet at one end and a water outlet at the other end and means for showering connected to the water outlet of said cartridge type filter, said cartridge type filter containing a tannin layer consisting of a material comprising tannin, a bakuhanseki layer consisting of granular bakuhanseki formed in a layer, a ceramic layer consisting of granular ceramic formed in a layer, a magnetite layer consisting of broken pieces of magnetite formed in a layer and provided at least on the water inlet side or on the water outlet side of the ceramic layer, and magnetizing means for magnetizing said magnetite layer.

2. A shower device as defined in claim 1 wherein said magnetizing means comprises a pair of annular magnets provided both on the water inlet side and on the water outlet side of the ceramic layer in such a manner that these annular magnets coincide with each other in the direction of magnetic lines of force and that the direction of the magnetic lines of force is parallel to the direction of flow of water.

* * * * *